Aug. 14, 1934.　　　M. G. DUMAS　　　1,969,878
COOKING UTENSIL
Filed July 26, 1932　　2 Sheets-Sheet 1

Inventor.
Maxwell G. Dumas
by William B. Jaspert
Attorney.

Aug. 14, 1934. M. G. DUMAS 1,969,878
COOKING UTENSIL
Filed July 26, 1932  2 Sheets-Sheet 2
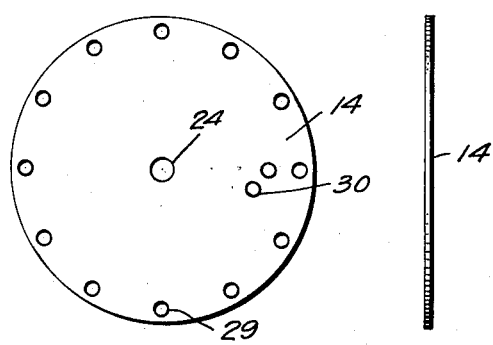
Fig. 6.   Fig. 7.   Fig. 8.
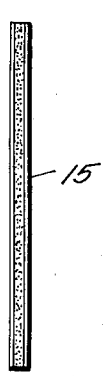 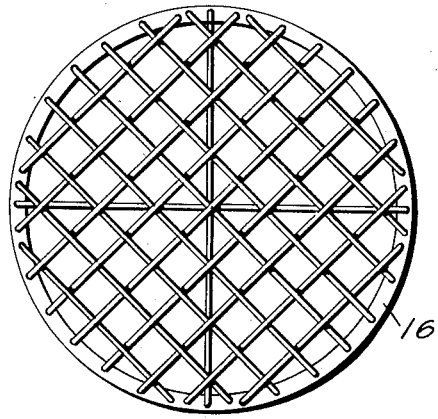 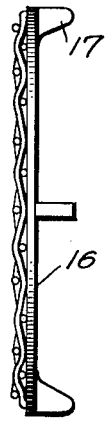
Fig. 9.   Fig. 10.   Fig. 11.
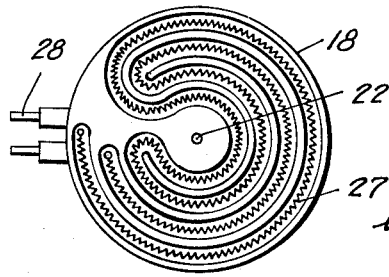
Fig. 12.
Inventor.
Maxwell G. Dumas
by William B. Jaspert
Attorney.

Patented Aug. 14, 1934

1,969,878

UNITED STATES PATENT OFFICE 1,969,878

COOKING UTENSIL

Maxwell Gerson Dumas, Pittsburgh, Pa.

Application July 26, 1932, Serial No. 624,684

4 Claims. (Cl. 219—43)

This invention relates to improvements in cooking utensils more particularly to the type in which the heating element is contained within the utensil, and it is among the objects thereof to provide a transportable cooking utensil which shall be adapted to a variety of uses, which shall be of simple and economical construction, and consists of a plurality of cooperating parts, all as illustrated and described in connection with the accompanying drawings.

Figure 1:
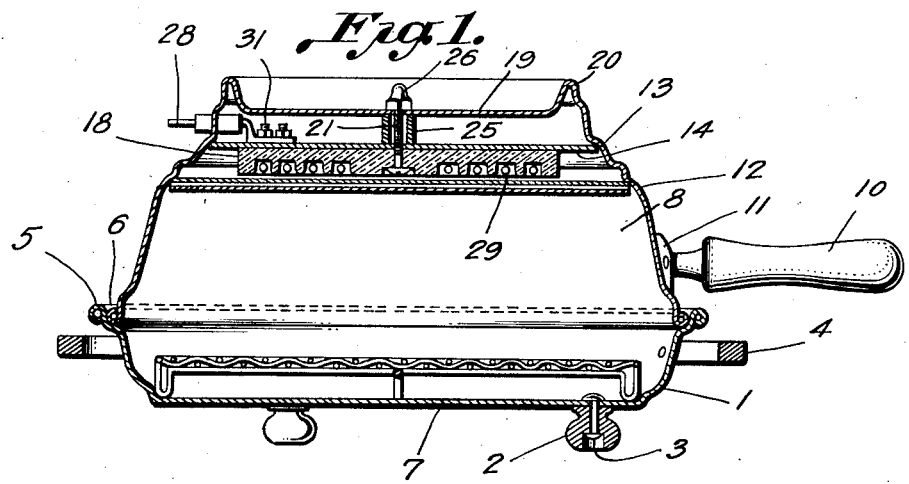
Figure 2:
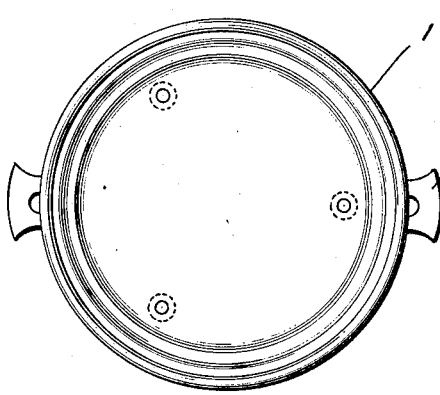
Figure 4:
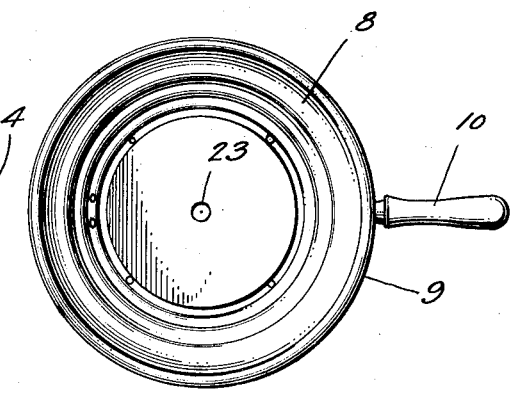
Figure 3:
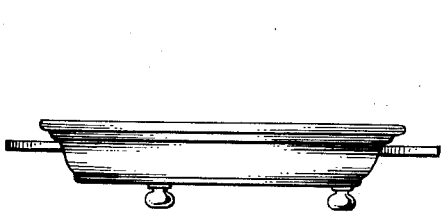
Figure 5:

In the drawings, Figure 1 is a sectional elevational view of a cooking utensil embodying the principles of this invention;

Figures 2 and 3 top plan and side elevational views respectively of the base member or stand;

Figures 4 and 5 top plan and side elevational views of the top or heating unit;

Figures 6 and 7 a top plan and side elevational views respectively of a baffle plate;

Figures 8 and 9 top plan and side elevational views respectively of a griddle plate;

Figures 10 and 11 top plan and side elevational views respectively of a grid support; and, Figure 12 a top plan view of the heating element.

With reference to the several figures of the drawings, the structure therein illustrated comprises the pan or base 1, Figures 1, 2 and 3, having supporting knobs or legs 2 which are secured thereto by screws 3 and having lugs or handle members 4 secured to the side thereof. As shown in Figure 1, the base member or pan 1 is provided with a bead 5 forming a shoulder portion 6 and the bottom portion of the pan designated by the numeral 7 is flat.

The upper member or cooking unit comprises a hood generally designated by the reference numeral 8, Figures 1, 4 and 5, having a beaded flange 9 which interacts with and seats in the shoulder portion 6 of the pan 1 to form a sealed joint.

The member 8 is provided with a handle 10 which is heat insulated and secured to the body of the member 8 by riveting its flange portion 11 thereto.

The hood 8 is provided with a series of shoulders 12 and 13 that constitute seating shoulders for a baffle plate or disk 14, Figures 6 and 7, and the plate 15, Figures 8 and 9. The plate 15 comprises two sheet metal disks with a layer of asbestos therebetween having perforations 15' to provide for circulation of heat. The grid 16, Figures 10 and 11, is provided with seats or chairs 17 which rest on the flat bottom portion 7 of the pan 1.

A heater in the form of an electrical resistor element 18, Figures 1 and 12, is secured to the top of the hood 8 which is an indented portion 19 forming a structural bead 20 which greatly strengthens the hood and constitutes the top wall 19 a rigid member.

The heating unit 18 is assembled in the hood 8 by abutting the baffle plate 14 on the shoulder 13, placing the porcelain member of the resistor unit 18 against the baffle plate 14, and extending a screw 21 through the central opening 22 of the heating element 18 and through the perforation 23, Figure 4, provided in the top wall of the hood. The screw 21 will also pass through the perforation 24 of the baffle plate 14, Figure 6, and a spacing sleeve 25 is disposed around the screw 21 and between the wall 19 and plate 14 so that a nut 26 can be tightly drawn to firmly secure the porcelain member in place without distorting plate 14 or the wall 19.

The heating unit 18 consists of an electrical resistor element 27 having terminals 28 which project through the side of the hood 8 as shown in Figure 1 for receiving the socket of an electrical circuit commonly known as a utility socket, and the grooves 29 of the porcelain in which the element is wound are of a flaring character and relatively wide to cause a rapid and effective radiation of the heat from the element to the interior heating chamber constituted by the members 1 and 8.

The member 14 is provided with a plurality of perforations 29, and perforations 30, the members 30 being provided for the terminal screws 31, Figure 1. The upper portion 20 of the hood 8 is provided with a plurality of perforations 32 including vents for the odor and smoke accumulating in the cooking chamber.

The operation of the above described cooking utensil is briefly as follows: The articles to be cooked are placed on the base member 1 or if desired to keep it out of contact with the cooking greases or juices, the grid 16 is placed on the base 7 of the pan 1, and the article to be cooked is placed on the grid. The hood or cover 8 is then placed in the shoulder or groove 6 of the pan and terminals 28 are connected in an electrical circuit.

The resistor element 27 will become energized and broil the food stuff contained on the grid 16 which, because of the heat retaining baffle plate 14, rapidly heats, and cooks the food articles in a minimum length of time. Any smoke or odor developed in the cooking chamber of the hood 8 passes through perforations 29 into the comparatively dead chamber between the baffle 14 and the top wall 19 of the hood in which they condense leaving such vapors as accumulate under pressure to pass through the perforations 32, Figure 5, of the hood. The mode of using the utensils as described above is applicable for the broiling of eggs, meat or the like, the utensil being designed to be of such a size that chickens may be broiled therein.

The utensil has further utility by reversing it, that is to say, by placing the hood 8 on the bead 20, the latter is constituted the base or bottom of the utensil, and when turned up in this manner the plate 15 is employed by placing it against its seating shoulder 12 and the utensil can then be used for baking or the like. When so inverted, the base member 1 may be employed as a cover to constitute the utensil a so-called dutch oven.

Instead of placing the base 1 on the inverted top unit the plate 15 may be omitted and a plain disk supported on the upturned edge 6 to make griddle cakes.

It is evident from the foregoing description of the invention that a utensil constructed in accordance therewith provides simple and economical means for cooking in small apartments or the like, and in addition, the utensil possesses the utility of a complete electric range. In the normal position of its use as shown in Figure 1, it is constituted a broiler and in the inverted position suggested it is constituted a hot plate and pan combined. Also, by employing the base member 1 as a cover in its inverted position, the utensil is a dutch oven.

Although one embodiment of the invention has been herein illustrated and described, it will be obvious to those skilled in the art that various modifications may be made in the details of construction without departing from the principles herein set forth.

I claim as my invention:

1. An electrical cooking utensil comprising a hood or cover member having off-set portions constituting seating shoulders, a plurality of disks seated on said shoulders, one of said disks being perforated and adapted to support a heating unit, a heating element disposed against said last named disk and having a connection with the top wall of the hood, and spacing means disposed between the top wall and the perforated disk to maintain an air space therebetween.

2. A cooking utensil embodying a pan or base member having a plurality of pedestals constituting supports and having a beaded shoulder constituting a seating flange, a hood member having a beaded flange of the exterior dimensions of the inner dimensions of the shoulder in said base member, and adapted to intimately engage the same to constitute a seal, a heating unit disposed within and secured to the top of said hood and having a baffle plate disposed between the unit and the hood, and means for securing said unit to the top wall of the hood, said baffle plate and hood being provided with perforations for venting the interior chamber of the hood.

3. An electrical cooking utensil comprising a base and hood member forming a cooking chamber, said hood member having off-set portions constituting shoulders, a plurality of disks seated on said shoulders, a heating unit disposed between said shoulders and adapted to abut against one of said disks, anchorage means for securely fastening said unit against its abutment, spacing means for maintaining a uniform space between the disk and the top wall of the hood, and terminals interposed between the last named disk and the top wall of the hood and extending externally of said hood for effecting an electrical connection of the heating element with an energizing circuit.

4. An electrical cooking utensil comprising a container having a hood or cover therefor, a heating element mounted in spaced relation with the top of said hood to provide a venting chamber, and means establishing communication between the space below said heating element and the venting chamber and vents in the top of said hood leading to the atmosphere, said hood being provided with off-set portions to constitute shoulders for mounting said heating elements in spaced relation with the top of the hood.

MAXWELL GERSON DUMAS.